(12) United States Patent
Osswald et al.

(10) Patent No.: US 8,182,677 B2
(45) Date of Patent: May 22, 2012

(54) TANK FLANGE

(75) Inventors: Bernd Osswald, Farmington Hills, MI (US); Alfred Mueller, Waiblingen (DE); Klaus Gebert, Willich (DE); Peter Schelhas, Stuttgart (DE)

(73) Assignees: Robert Bosch GmbH, Stuttgart (DE), part interest; Kautex Textron GmbH & Co. KG, Bonn (DE), part interest ( * ) Notice: Subject to any disclaimer, the term of this patent is extended or adjusted under 35 U.S.C. 154(b) by 440 days.

(21) Appl. No.: 12/515,187

(22) PCT Filed: Sep. 25, 2007

(86) PCT No.: PCT/EP2007/060136
§ 371 (c)(1), (2), (4) Date: May 15, 2009

(87) PCT Pub. No.: WO2008/061830
PCT Pub. Date: May 29, 2008

(65) Prior Publication Data
US 2010/0065572 A1    Mar. 18, 2010

(30) Foreign Application Priority Data
Nov. 21, 2006 (DE) .......................... 10 2006 054 699

(51) Int. Cl.
*B01D 35/30* (2006.01)
*B01D 35/34* (2006.01)
*B01D 29/00* (2006.01)
*B01D 27/00* (2006.01)

(52) U.S. Cl. ................... 210/172.1; 210/232; 210/416.1; 210/416.4; 210/435; 210/446; 210/455

(58) Field of Classification Search .................... None
See application file for complete search history.

(56) References Cited

U.S. PATENT DOCUMENTS 5,520,156 A * 5/1996 Brunnhofer .................... 123/516
5,649,514 A * 7/1997 Okada et al. ................... 123/514

FOREIGN PATENT DOCUMENTS

| DE | 19605952 A1 | 8/1997 |
| DE | 101 19 554 A1 * | 10/2002 |
| DE | 10119554 A1 | 10/2002 |
| EP | 0579540 A1 | 1/1994 |
| EP | 0612919 A1 | 8/1994 |

* cited by examiner

*Primary Examiner* — Benjamin Kurtz
(74) *Attorney, Agent, or Firm* — Ronald E. Greigg

(57) ABSTRACT

Known tank flanges have a main filter which has a filter housing with an inlet and an outlet, and a first connecting duct for connecting the main filter to a feed unit. The filter housing is integrated in the tank flange, and filter fabric is inserted into the filter housing and the filter housing is closed off by a filter cover. The inlet of the filter housing is connected to the pressure side of a feed unit and the outlet leads to an internal combustion engine. A disadvantage is that, in order to exchange the filter fabric, the large-area filter cover must be opened, as a result of which a large amount of fuel vapor is dissipated to the atmosphere. In the case of the tank flange according to the invention, the exchangeability of the main filter is simplified by virtue of the main filter being embodied as a filter cartridge. It is provided according to the invention that the inlet of the main filter extends into the first connecting duct of the tank flange and therein forms a sealed connection.

14 Claims, 1 Drawing Sheet

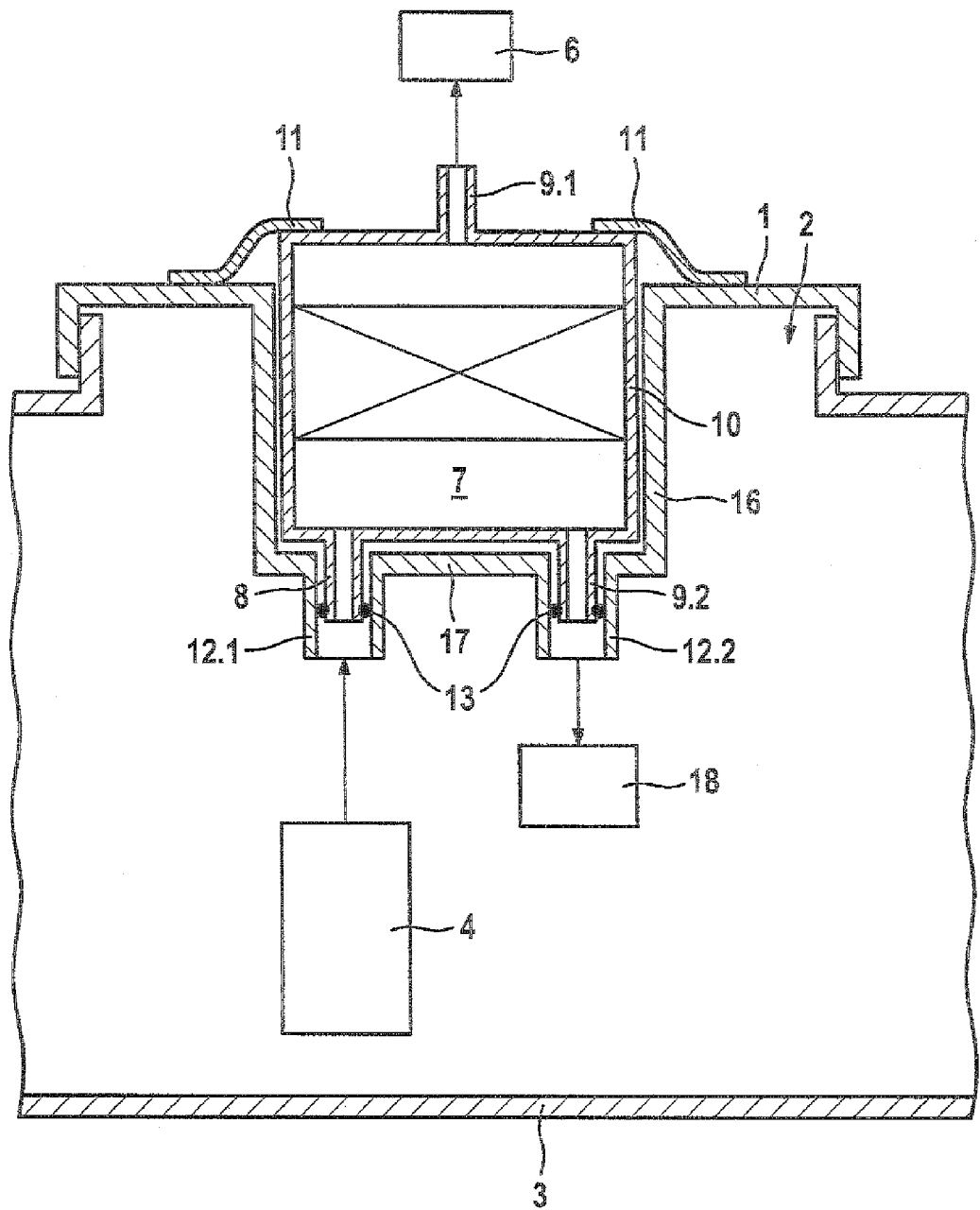

TANK FLANGE

CROSS-REFERENCE TO RELATED APPLICATION

This application is a 35 USC 371 application of PCT/EP 2007/060136 filed on Sep. 25, 2007.

BACKGROUND OF THE INVENTION

1. Field of the Invention

The invention is based on a tank flange for a fuel tank.

2. Description of the Prior Art

A tank flange is already known from European Patent Disclosure EP 0 612 919 A1, having a main filter that has a filter housing with an inlet and an outlet, and having a first connection conduit for connecting the main filter to a feed unit. The filter housing is integrated with the tank flange, and the filter cloth is inserted into the filter housing, and the filter housing is closed with a filter cap. The inlet of the filter housing communicates with the compression side of a feed unit, and the outlet leads to an internal combustion engine.

It is disadvantageous that the large-area filter cap has to be opened for replacing the filter cloth.

ADVANTAGES AND SUMMARY OF THE INVENTION

The tank flange of the invention has the advantage over the prior art that replacement of the main filter is facilitated in a simple way, because the inlet of the main filter extends into the first connection conduit of the tank flange and forms a tight connection. The main filter with its own housing can be replaced by loosening a simple mount. The pressure forces actin on the mount are slight because of the embodiment according to the invention.

It is especially advantageous if the main filter has a second outlet, which extends into a second connection conduit of the tank flange and forms a tight connection with the second connection conduit. This embodiment is especially space-saving, since the pressure regulator is mounted directly at the second outlet, and in this way no further hydraulic lines are necessary.

It is moreover advantageous if the inlet and the second outlet of the main filter are embodied as stubs, on each of which at least one sealing element is provided that forms the tight connection with the first connection conduit and with the second connection conduit, respectively. In this way, a plug-type connection is formed, which makes it especially easy to replace the main filter.

It is highly advantageous if the tank flange has an indentation, into which the filter housing of the main filter is inserted, since in this way little space above the tank flange is needed. Moreover, the main filter in the indentation is protected against damage from the exertion of force from outside.

It is also advantageous if the first connection conduit and the second connection conduit are embodied on a bottom of the indentation.

It is moreover advantageous if the filter housing is fixed to the tank flange by means of at least one mount. In this way it is reliably assured that the connection of the main filter with the tank flange does not come loose. In an advantageous feature, the mount has spring elements, is embodied elastically resiliently, or has spring-like properties, which press the filter housing against the tank flange.

BRIEF DESCRIPTION OF THE DRAWING

The invention is described in further detail in the ensuing description in conjunction with the drawing, in which:

The sole drawing FIGURE shows a tank flange for a fuel tank according to the invention.

DESCRIPTION OF THE PREFERRED EMBODIMENTS

The tank flange 1 according to the invention is embodied as a cap, which closes a tank opening 2 of a fuel tank 3. The tank opening 2 is needed in order to insert a device for supplying fuel, such as a so-called fuel supply module, into the fuel tank 3. The device for supplying fuel includes at least one feed unit 4, such as an electric fuel pump. Once the components have been installed in the fuel tank 3, the tank opening 2 is tightly closed by the tank flange 1. The feed unit 4 supplies fuel from the fuel tank 3 to an internal combustion engine 6. Between the feed unit 4 and the engine 6, a main filter 7 is provided, which removes fine dirt particles from the fuel. The main filter 7 has one inlet 8 and at least one first outlet 9.1 and is disposed on the tank flange 1. The inlet 8 of the main filter 7 communicates fluidically with the feed unit 4, and the first outlet 9.1 communicates fluidically with the engine 6.

According to the invention, the main filter 7 is embodied as a filter cartridge, which has its own filter housing 10. The filter housing 10 is embodied as fuel-pressureproof and is for instance of metal or of electrically conductive or nonconductive plastic. The filter housing 10 is electrically grounded for instance via the tank flange 1 or a separate grounding cable, not shown. The filter cartridge 7 is plugged into the tank flange 1 and is fixed to the tank flange 1 for instance by at least one mount 11.

According to the invention, the tank flange 1 has a first connection conduit 12.1. The inlet 8 of the main filter 7 is embodied as a stub and extends into the first connection conduit 12.1. Upon insertion of the inlet 8 into the first connection conduit 12.1, a tight connection is formed between the first connection conduit 12.1 and the inlet 8, for instance by means of at least one sealing element 13. The at least one sealing element 13 is for instance an O-ring, which is disposed for instance in a groove provided on the outer circumference of the inlet 8.

As an example, the main filter 7 is disposed at least in some portions in a cup-shaped indentation 16 in the tank flange 1. In this way, the main filter 7 is protected against damage from an external exertion of force. Moreover, hardly little space above the tank flange 1 is necessary. The indentation 16 is open toward the surroundings of the fuel tank 3, so that the main filter 7 is accessible and replaceable from outside the fuel tank 3. For replacing the main filter 7, the tank flange 1 need not be opened. In devices of the prior art, it is often necessary to open the tank flange, especially if the main filter is integrated with the so-called fuel supply module. For replacing the main filter 7, it suffices to open the inlet 8 and the at least one outlet 9.1 of the main filter 7, which all have a small cross section, so that upon opening, less fuel vapor is emitted to the environment.

According to the invention, however, the main filter 7 could in principle also be slipped onto the tank flange 1 without an indentation 16.

In a further development, the main filter 7 may have a second outlet 9.2, which is likewise embodied as a stub and extends into a second connection conduit 12.2 of the tank flange 1. Upon insertion of the second outlet 9.2 into the second connection conduit 12.2, a tight connection is formed between the second connection conduit 12.2 and the second outlet 9.2, for instance by means of at least one sealing element 13. The at least one sealing element is for instance an O-ring, which is disposed for instance in a groove provided on the outer circumference of the second outlet 9.2. The second connection conduit 12.2 communicates fluidically for instance with a valve 18, which opens at a predetermined pressure in the filter housing 10 and allows fuel to flow out of the filter housing 10 back into the fuel tank 3. The valve 18 may be embodied as an overpressure valve or is a pressure regulating valve. In the case of a pressure regulating valve 18, a predetermined pressure is set in the fuel line between the feed unit 4 and the engine 6. The valve 18 is mounted for instance directly on the second connection conduit 12.2.

For example, the first connection conduit 12.1 is embodied on a bottom 17 of the cup-shaped indentation 16. If the second connection conduit 12.2 is provided, then it too is disposed for instance on the bottom 17.

In a further refinement, the at least one mount 11 is embodied elastically resiliently and presses the main filter 7 against the tank flange 1, for instance against the bottom 17 of the indentation 16. The at least one mount 11 is fixed by one end to the tank flange 1 and by its other end to the main filter 7. For replacing the main filter 7, the mount 11 is loosened in such a way that the main filter 7 can be pulled out of the indentation 16 in the direction away from the tank flange 1. Before the replacement of the main filter 7, the hydraulic system between the feed unit 4 and the engine 6 is pressure-relieved, for instance to injection valves of the engine 6.

The main filter 7 is connected to the electrical ground, for instance via the mount 11.

The foregoing relates to the preferred exemplary embodiments of the invention, it being understood that other variants and embodiments thereof are possible within the spirit and scope of the invention, the latter being defined by the appended claims.

The invention claimed is:

1. A tank flange for closing a mounting opening of a fuel tank, comprising:
    a main filter, which has a filter housing with one inlet and at least one outlet, disposed in an indentation in the tank flange, wherein the indentation is open to the surroundings of the fuel tank and has a bottom,
    a first connection conduit disposed in the tank flange for communication with a feed unit, and
    at least one elastically resilient mount having one end fixed to the tank flange and another end resting on the filter housing,
    wherein the first connection conduit of the tank flange is embodied on the bottom of the indentation,
    wherein the inlet of the filter housing extends into the first connection conduit of the tank flange and forms a sealed connection therein, and
    wherein the at least one elastically resilient mount presses the filter housing against the bottom of the indentation in the tank flange.

2. The tank flange as defined by claim 1, wherein the filter housing has a second outlet, which extends into a second connection conduit of the tank flange and forms a sealed connection with the second connection conduit.

3. The tank flange as defined by claim 2, wherein the inlet and the second outlet of the filter housing are embodied as stubs, on each of which at least one sealing element is provided that forms the sealed connection with the first connection conduit and with the second connection conduit, respectively.

4. The tank flange as defined by claim 2, wherein the second connection conduit is disposed on the bottom of the indentation.

5. The tank flange as defined by claim 1, wherein the first connection conduit communicates fluidically with the feed unit.

6. The tank flange as defined by claim 2, wherein the second connection conduit communicates fluidically with a valve.

7. The tank flange as defined by claim 1, wherein the main filter is embodied as a filter cartridge.

8. The tank flange as defined by claim 1, wherein the at least one elastically resilient mount is embodied as a spring element.

9. The tank flange as defined by claim 1, wherein the tank flange is embodied as a cap for closing the mounting opening of the fuel tank.

10. The tank flange as defined by claim 1, wherein the feed unit is embodied as a fuel pump.

11. The tank flange as defined by claim 1, wherein the at least one outlet in the filter housing supplies fuel from the fuel tank to an internal combustion engine.

12. The tank flange as defined by claim 6, wherein the valve is embodied as an overpressure valve or a pressure regulating valve.

13. The tank flange as defined by claim 3, wherein the at least one sealing element is an o-ring.

14. The tank flange as defined by claim 13, wherein the o-ring is disposed in a groove provided on an outer circumference of the inlet and the second outlet.

* * * * *